(12) United States Patent
Fuehrer (10) Patent No.: US 8,550,275 B2
(45) Date of Patent: Oct. 8, 2013

(54) HOUSING ASSEMBLY

(75) Inventor: Thomas Fuehrer, Blomberg (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 13/262,249

(22) PCT Filed: Mar. 24, 2010

(86) PCT No.: PCT/EP2010/001847
§ 371 (c)(1),
(2), (4) Date: Sep. 30, 2011

(87) PCT Pub. No.: WO2010/112167
PCT Pub. Date: Oct. 7, 2010

(65) Prior Publication Data
US 2012/0024879 A1    Feb. 2, 2012

(30) Foreign Application Priority Data

Mar. 30, 2009    (DE) .......................... 10 2009 014 851

(51) Int. Cl.
*B65D 43/16* (2006.01)
*H01R 13/502* (2006.01)
(52) U.S. Cl.
USPC ........................... 220/4.02; 220/815; 174/562
(58) Field of Classification Search
USPC .................. 220/4.02, 3.8, 3.2, 810, 834, 833, 220/832, 831; 174/562, 561, 560, 559, 520, 174/50
IPC ...................... B65D 43/16,51/04; H01R 13/502
See application file for complete search history.

(56) References Cited

U.S. PATENT DOCUMENTS

| 2,792,143 | A | * | 5/1957 | Seeger .......................... 220/4.02 |
| 3,170,029 | A | * | 2/1965 | Stewart .......................... 174/66 |
| 3,451,580 | A | * | 6/1969 | Husby .......................... 220/4.21 |
| 3,895,179 | A | * | 7/1975 | Wyatt .......................... 174/50 |
| 3,910,448 | A | * | 10/1975 | Evans et al. .................... 220/3.8 |
| 4,199,072 | A | * | 4/1980 | Jacks ............................ 220/3.4 |
| 4,757,920 | A | | 7/1988 | Harootian, Jr. et al. |
| 4,873,600 | A | * | 10/1989 | Vogele .......................... 361/823 |
| 5,065,884 | A | * | 11/1991 | Naritomi et al. ............... 220/264 |
| 5,066,832 | A | * | 11/1991 | Clarey et al. .................... 174/50 |
| 5,378,174 | A | | 1/1995 | Brownlie et al. |
| 5,762,224 | A | * | 6/1998 | Benn et al. .................... 220/4.02 |

(Continued)

FOREIGN PATENT DOCUMENTS

| DE | 1881174 U | 10/1963 |
| EP | 1646118 A2 | 4/2006 |
| GB | 1580037 A | 11/1980 |

*Primary Examiner* — Robert J Hicks
(74) *Attorney, Agent, or Firm* — Leydig, Voit & Mayer, Ltd.

(57) ABSTRACT

A housing assembly includes a receptacle having a bottom, a front wall, a rear wall, and two side walls. The rear wall has a larger height than the front wall and the side walls decrease in height from the rear wall toward the front wall. The receptacle is configured to receive at least one connection element for connecting at least one electrical cable and has at least one opening for the at least one electrical cable. A lid is configured to close the receptacle. The lid is pivotably disposable on the receptacle with a pivot axis adjoining the rear wall of the receptacle.

11 Claims, 5 Drawing Sheets

(56) References Cited

U.S. PATENT DOCUMENTS

| | | |
|---|---|---|
| 6,069,315 A | 5/2000 | Tang |
| 6,362,421 B1 | 3/2002 | Layton, Jr. |
| 6,765,147 B1 * | 7/2004 | Weiss et al. ............ 174/60 |
| 2003/0080131 A1 * | 5/2003 | Fukuo ............ 220/264 |
| 2005/0247474 A1 * | 11/2005 | Weise et al. ............ 174/50 |
| 2006/0086521 A1 | 4/2006 | Andresen et al. |

* cited by examiner

HOUSING ASSEMBLY

CROSS REFERENCE TO RELATED APPLICATIONS

This application is a U.S. National Phase application under 35 U.S.C. §371 of International Application No. PCT/EP2010/001847, filed on Mar. 24, 2010, and claims benefit to German Patent Application No. DE 10 2009 014 851.5, filed on Mar. 30, 2009. The International Application was published in German on Oct. 7, 2010 as WO 2010/112167 A2 under PCT Article 21 (2).

FIELD

The present invention relates to a housing assembly for electrical connections, in particular.

BACKGROUND

The European Patent Application EP 1 646 118 A2 describes such a housing assembly having at least two junction boxes, a base part and a lid. The junction boxes each have a square housing, a terminal strip having at least one connecting terminal being configured in the housings for electrically connecting an electrical cable or a line, and the housing having at least one opening for electrical cables or lines. The individual junction boxes are superposed in a 0°, 90°, 180° or 270° mutually angularly offset configuration. The terminal strips are designed as plug connectors having a connector part and a socket part. The plug connectors are fastenable into a junction box in four 90° mutually angularly offset positions. The plug connectors of two superposed junction boxes are interconnectable in such a way that the connector part of the one plug connector is insertable into the socket part of the other plug connector.

The side walls of the socket part, respectively of the junction boxes are equal in height, and the lid is fastened to one of the junction boxes by screws. To open the housing assembly, the screws must first be removed before the lid can be lifted off, so that it is very cumbersome to service the housing assembly. It is also difficult for a user to access the interior of the housing assembly, so that it is problematical to attend to the connection elements inside of the housing assembly.

SUMMARY

In an embodiment, the present invention provides a housing assembly including a receptacle having a bottom, a front wall, a rear wall, and two side walls. The rear wall has a larger height than the front wall and the side walls decrease in height from the rear wall toward the front wall. The receptacle is configured to receive at least one connection element for connecting at least one electrical cable and has at least one opening for the at least one electrical cable. A lid is configured to close the receptacle. The lid is pivotably disposable on the receptacle with a pivot axis adjoining the rear wall of the receptacle.

BRIEF DESCRIPTION OF THE DRAWINGS

Exemplary embodiments of the present invention are described in more detail below with respect to the drawings, in which.

DETAILED DESCRIPTION

In an embodiment, the present invention provides a housing assembly that will feature an improved ease of use.

The housing assembly according to embodiments of the present invention features a receptacle having a bottom, a front wall, a rear wall and two side walls for accommodating at least one connection element for connecting electrical cables, the receptacle having at least one opening for electrical cables. The housing assembly also features a lid that is adapted for closing the receptacle. The lid may be pivotably mounted on the receptacle, the pivot axis of the lid being configured at both side walls, adjoining the rear wall of the receptacle, the side walls being designed to fall off in height from the rear wall toward the front wall.

The housing assembly is preferably to be serviced by a user by way of the front wall of the receptacle. The housing assembly according to an embodiment of the present invention is characterized by an exceptional ease of use. To open the housing assembly, a pivoting movement may be used to lift up the lid. The pivot axis of the lid is configured at both side walls in the area of the rear wall of the receptacle. Upon opening the housing assembly, respectively the lid, the lid is swiveled upwardly by a specific angle, preferably by an angle of between 20° and 50°, to the edge of the side wall surface.

The lid remains seated on the receptacle until the opening angle is reached. Upon reaching the opening angle, the lid disengages from the support and may be removed from the receptacle.

The receptacle design advantageously features a higher rear wall than front wall. The front wall height is preferably diminished by 80% relative to the rear wall height. This provides easy access for the user to inspect the receptacle interior and perform work therein, such as the rearranging of cables, for example. For that purpose, the side walls are designed to fall off in height from the rear wall toward the front wall. Accordingly, the lid contour is configured to be greater in height in the area of the receptacle front wall than in the area of the receptacle rear wall. In the closed state, when the lid rests on the receptacle, the housing assembly is preferably configured as an essentially rectangularly shaped box.

One advantageous embodiment of the present invention provides for the connection element to be located at the rear wall of the receptacle. This makes the front region of the receptacle freely accessible, and the user is able to easily service the connection element. If the housing assembly has more than one connection element, then all of the connection elements are preferably located at the rear wall of the receptacle.

It is also preferably provided for the connection element to be located at an angle of >0° to the bottom of the receptacle. In this context, the angular configuration is evident along a cable that is configured in the connection element, respectively along the cable axis thereof. Thus, the connection element is not configured in parallel to the bottom of the receptacle, rather at an angle >0° thereto. Instead, the rear wall of the receptacle is preferably disposed at least somewhat non-perpendicularly to the bottom of the receptacle, rather preferably at an angle of <90° thereto, so that the rear wall is at least partially inclined toward the bottom. This substantially enhances the serviceability of the connection element.

Another advantageous embodiment of the present invention provides for the opening for electrical cables to be located at the rear wall of the receptacle. This makes the front region of the receptacle freely accessible and not restricted by any conductors potentially configured to pass through an opening. If the housing assembly has more than one opening, it is preferable for all of the openings to be located at the rear wall of the receptacle. Thus, both the connection elements, as well as the openings for the electrical cables are preferably located at the rear wall of the receptacle.

To provide a user-friendly possible receptacle contour, the surface of the sides walls of the receptacle adjoining the lid is configured to feature at least two negative slope angles $\alpha$, $\beta$, negative slope angle $\alpha$, $\beta$ decreasing in degrees from the rear wall toward the front wall. Negative slope angle $\alpha$, $\beta$ is the angle between one plane extending in parallel to the bottom of the receptacle and one plane extending along the surface of the side walls adjoining the lid. This means that the side wall is preferably configured to first slope down relatively steeply from the rear wall, and less steeply toward the front wall. Thus, in the area of the front wall, the side wall has a very low height. It is thus possible for the receptacle interior to also be readily accessible by way of the side walls thereof, and for the side walls to be configured to provide the least possible hindrance to a user.

In accordance with another advantageous embodiment of the present invention, the two side walls each feature a guide, guide elements integrally formed on the lid engaging in the guide. The guide is used for seating the lid on the receptacle and for guiding it along a desired path in response to a pivoting movement. The guide is preferably configured as a recess on the outer surface of the side walls, the recess being formed in such a way that the lid executes a pivoting movement along a circular path in response to opening and closing of the lid. The guide is designed to allow the lid to only be moved upward and downward by a pivoting movement. It prevents a lateral movement of the lid. The guide is preferably configured in the region of the pivot axis of the lid. The guide element is preferably designed in the form of a slightly bent nose-shaped plug.

To be able to realize a reliable and as defined as possible pivoting movement upon opening and closing of the lid, the contour of the guide element is adapted to the contour of the recess, so that, in the closed state of the housing assembly, respectively of the lid, the guide element fits precisely in the guide.

To fasten the lid to the receptacle, one preferred embodiment of the present invention provides that the lid be hooked into a recess provided in the area of the rear wall of the receptacle. For this purpose, adjacently to the guide element, the lid features an engagement element, preferably in the form of a rib, that is initially introduced into the recess in order to fasten the lid to the receptacle, thereby forming a form-locking connection. The recess and the guide are provided adjacently to the receptacle in such a way that, upon fastening of the lid into the recess, the guide element of the lid may likewise hook into the guide of the receptacle. If the lid is hooked into the recess and the guide, it is still in a type of suspended position in which it remains when it is hinged into the recess. Only in response to the application of a pressure to the lid, is it pivoted downward until it seals the receptacle. The recess is preferably formed as a groove.

In addition, another advantageous embodiment of the present invention provides a sealing rib that engages into a sealing groove for sealing the housing assembly. The sealing rib and sealing groove are preferably made of a metal. The sealing rib is preferably formed as a comb-type elevation that engages into the depression of the sealing groove in the closed state of the lid, respectively of the housing assembly. Since the sealing rib engages into the sealing groove upon closing of the housing assembly, respectively the lid, a positive guidance is thereby achieved, allowing the lid to rest tightly on the receptacle in the closed state. The positive guidance prevents any faulty positioning of the lid. The sealing rib is preferably provided on the lid and the sealing groove on the receptacle. Therefore, in the opened state, no elevation in the form of a sealing rib is present on the receptacle itself that could obstruct a user from accessing the receptacle interior.

In accordance with another advantageous embodiment of the present invention, the lid also features at least one pin-shaped element which, upon closing of the receptacle, engages into a recess provided on the receptacle. The pin-shaped element preferably engages into a recess configured on the front wall of the receptacle. The pin-shaped element makes possible a final centering and precise alignment of the lid upon closing thereof.

If more than one opening are provided on the receptacle for electrical cables, another preferred embodiment of the present invention provides that the openings be configured at different heights relative to the bottom of the receptacle. This makes it possible for a plurality of openings to be provided on a wall surface in a most space saving possible design.

Another preferred embodiment of the present invention also provides that the receptacle feature at least one replaceable distance element for the connection element located in the receptacle. The distance element is preferably provided between a connection element and a wall surface of the receptacle. Due to the position thereof within the receptacle, the cables located at the connection element are capable of exerting relatively high reaction forces on the connection elements in the direction of the receptacle wall. The distance element is able to absorb these reaction forces, making it possible to protect the connection element against faulty positioning.

Figure 1:
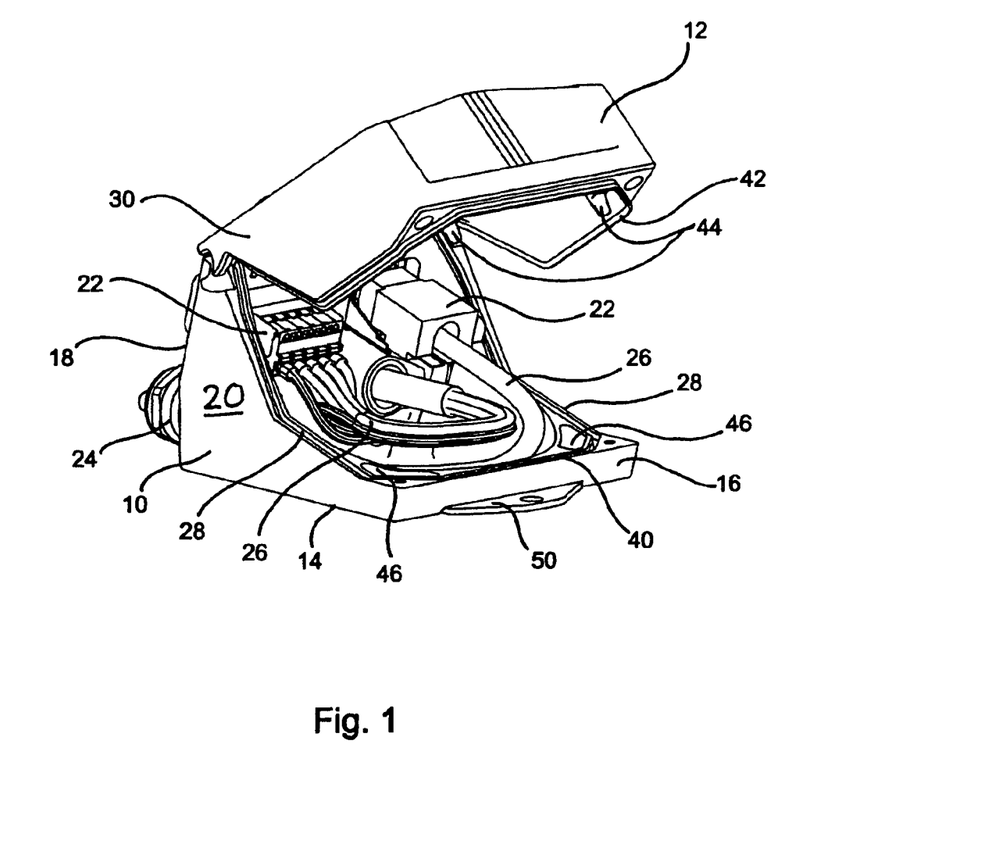
FIG. 1 is a schematic, perspective representation of a housing assembly according to an embodiment of the present invention.

FIG. 1 schematically shows a housing assembly according to the present invention having a receptacle 10 and a lid 12 that is adapted for closing receptacle 10. Receptacle 10 has a bottom 14, a front wall 16, a rear wall 18 and two side walls 20. Two connection elements 22, for example a connecting terminal assembly and a socket connection, are provided in the interior of receptacle 10. On the rear wall, the receptacle has three openings 24 which are clearly discernible in FIGS. 2 and 3. A screwed cable gland or a plug connector may be provided, for example, within openings 24. As is discernible in FIG. 4, openings 24 may be configured at heights that differ relative to bottom 14 of receptacle 10. Connection elements 22 and openings 24 are located at rear wall 22 of receptacle, thereby allowing a largest possible bend radius for arranging cables 26, given an ample volume of receptacle 10. Connection elements 22 are positioned at an angle of >0° relative to bottom 14 of receptacle 10. The angular configuration is evident along a cable 26 that is located in connection element 22, respectively along the cable axis thereof. Thus, connection element 22 is not configured in parallel to bottom 14 of receptacle 10, rather at an angle >0° to bottom 14 of receptacle 10. Instead, rear wall 18 of receptacle 10 is disposed at least somewhat non-perpendicularly to bottom 14 of receptacle 10; rather it is oriented at an angle of <90° thereto, so that rear wall 18 is at least partially inclined toward bottom 14.

The formation of receptacle 10 is such that it has a higher rear wall 18 than front wall 16, side walls 20 being designed to fall off in height from rear wall 18 toward front wall 16.

Figure 2:
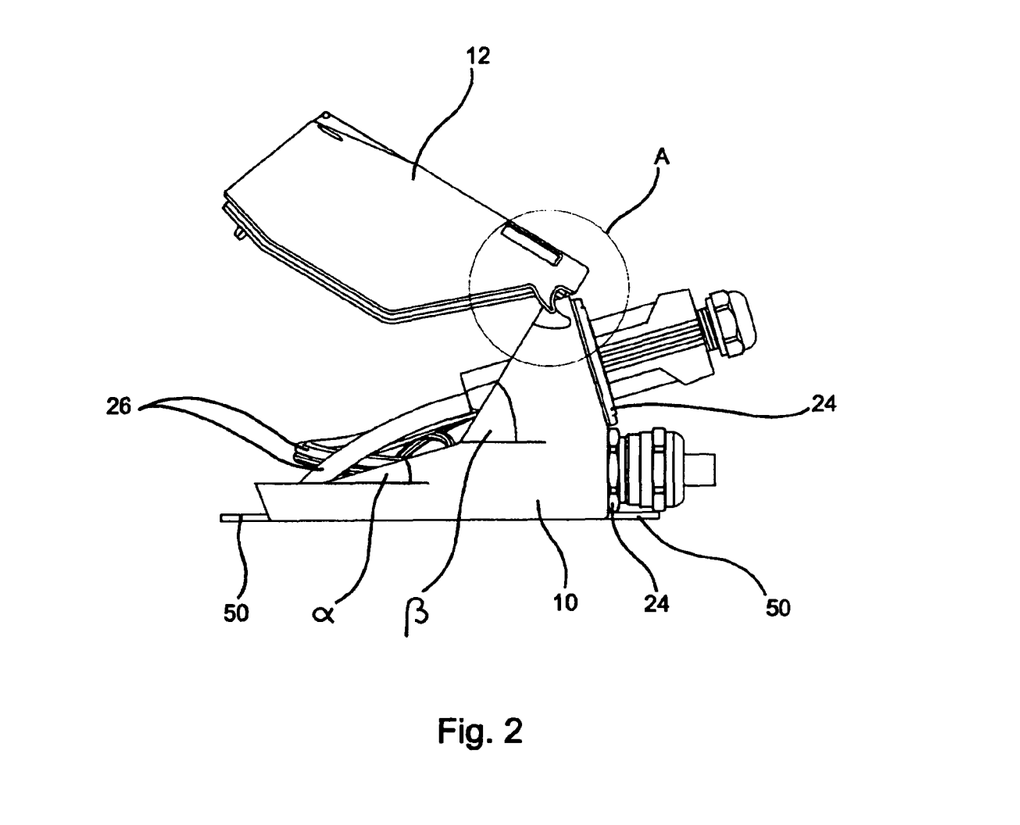
FIG. 2 is a schematic lateral view of the housing assembly according to an embodiment of the present invention.

Accordingly, the contour of lid 12 is such that it is greater in height in the area of front wall 16 of receptacle 10 than in the area of rear wall 18 of receptacle 10. In the closed state, when lid 12 rests on receptacle 10, the housing assembly is preferably configured as an essentially rectangularly shaped box. To design the most user-friendly possible contour for receptacle 10, surface 28 of sides walls 20 of receptacle 10 adjoining lid 12 is formed to have at least two negative slope angles α, β, as shown in FIG. 2, negative slope angle α, β decreasing in degrees from rear wall 18 toward front wall 16. Negative slope angle α, β is the angle between one plane extending in parallel to bottom 14 of receptacle 10 and one plane extending along surface 28 of side walls 20 adjoining lid 12. This means that side wall 20 is preferably configured to first slope down relatively steeply from rear wall 18, and less steeply toward front wall 16. Thus, in the area of front wall 16, side wall 20 has a very low height.

Lid 12 may be pivotably mounted on receptacle 10, pivot axis 30 of lid 12, i.e., the axis about which the lid is pivotably mounted, is configured at both side walls 20, adjoining rear wall 18 of receptacle 10. To seat lid 12 on receptacle 10 and to enable it to execute a pivoting movement along a desired path in the seated state, each of the two side walls 20, as shown in detail in FIG. 3, features a guide 32 in the form of a recess, guide elements 34 integrally formed on lid 12 engaging into guide 32. Guide 32 is formed to urge a pivoting movement of lid 12 along a circular path in response to opening and closing thereof. Guide 32 prevents lid 12 from moving laterally to the left or right. Guide 32 is preferably configured in the region of pivot axis 30 of lid 12. Guide element 34 is designed in the form of a slightly bent nose-shaped plug. To be able to realize a reliable and as defined as possible pivoting movement upon opening and closing of lid 12, the contour of guide element 34 is adapted to the contour of guide 32, so that, in the closed state of the housing assembly, respectively of lid 12, guide element 34 fits precisely in guide 32.

Figure 3:
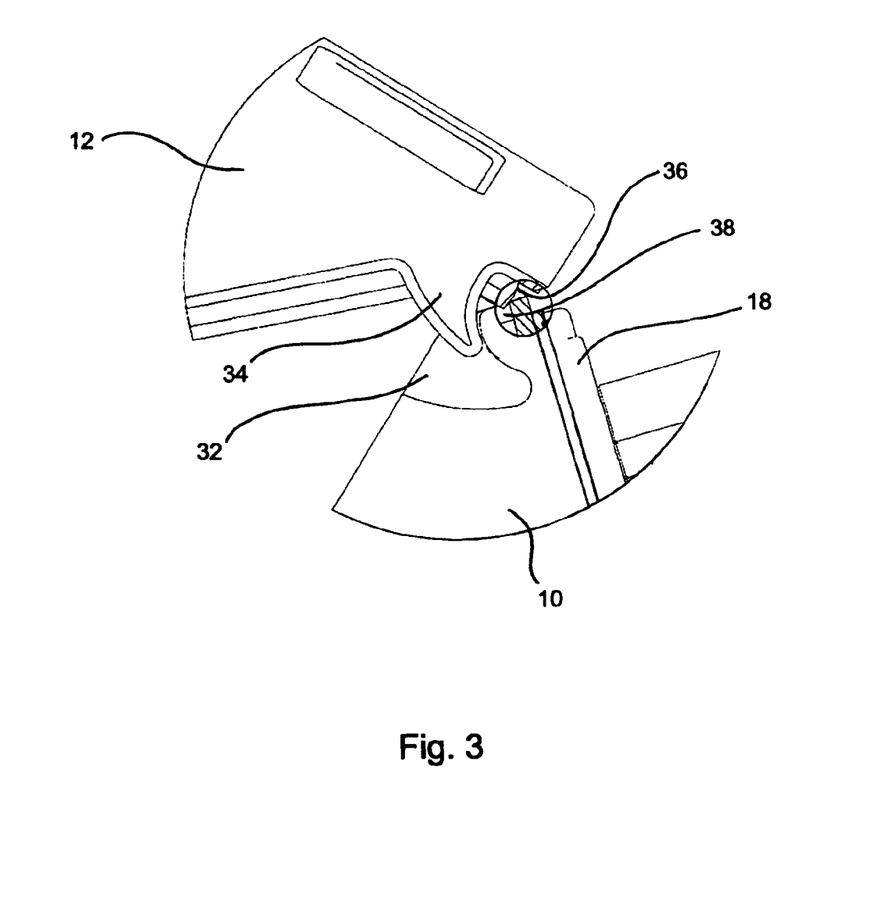
FIG. 3 is an enlarged view of detail A shown in FIG. 2.
Figure 4:
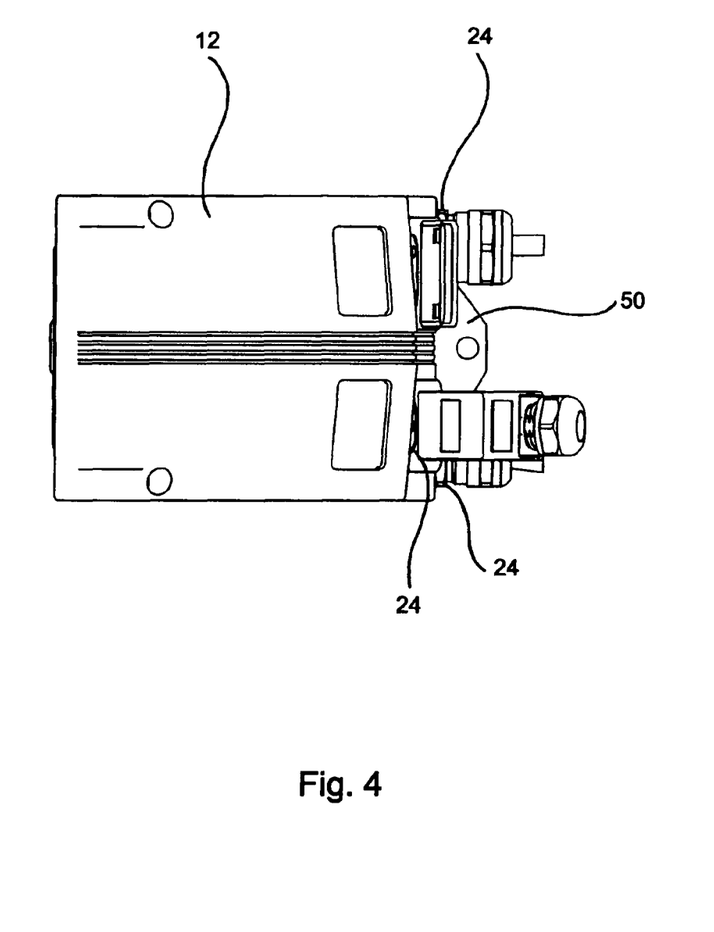
FIG. 4 is a schematic plan view of the housing assembly according to an embodiment of the present invention, having a closed lid.

To fasten lid 12 to receptacle 10, lid 12 is hookable into a recess 38 provided in the area of rear wall 18 of receptacle 10. For this purpose, lid 12 features an engagement element 36, preferably in the form of a rib, adjacently to guide element 34, that is initially introduced into recess 38 in order to fasten lid 12 to receptacle 10, thereby forming a form-locking connection. Recess 38 and guide 32 are provided adjacently to receptacle 10 in a way that allows guide element 34 of lid 12 to likewise hook into guide 32 of receptacle 10, upon fastening of lid 12 into recess 38. If lid 12 is engaged into recess 38 and guide 32, it is still in a type of suspended position in which it remains when it is hinged into recess 38. Only in response to application of a pressure to lid 12, is it pivoted downward until it seals receptacle 10. Recess 38 is preferably formed as a groove.

A sealing rib 42, which engages into sealing groove 40, is provided for sealing the housing assembly, sealing rib 42 and sealing groove 40 preferably being made of a metal. Sealing rib 42 is formed as a comb-type elevation which, in the closed state of the lid, engages into the depression of sealing groove 40. Sealing rib 42 is provided on lid 12, and sealing groove 40 on receptacle 10.

In addition, two pin-shaped elements 44 are configured on lid 12 that, in response to closing of receptacle 10, engage into two recesses 46 provided on front wall 16 of receptacle 10. Pin-shaped elements 44 make possible a final centering and precise alignment of lid 12 upon closing thereof.

Figure 5:
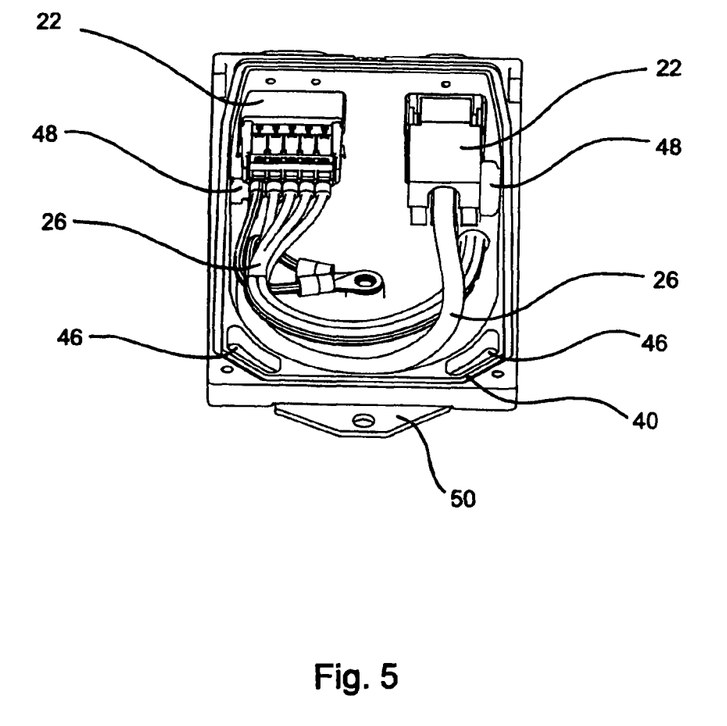
FIG. 5 is a schematic plan view of the housing assembly according to the present invention, having an open lid.

As shown in FIG. 5, replaceable distance elements 48 for connection elements 22 located in receptacle 10 are configured in the interior of receptacle 10. Distance elements 48 are preferably provided between a connection element 22 and a wall surface 16, 18, 20 of receptacle 10. Due to the position thereof within the receptacle, cables 26 located at connection elements 22 are capable of exerting relatively high reaction forces on connection elements 22 that are directed toward receptacle wall 16, 18, 20. Distance elements 48 are able to absorb these reaction forces, making it possible to protect connection elements 22 against faulty positioning.

To secure the housing assembly, fastening elements 50 in the form of plates, that are boltable to a base, are provided on receptacle 10.

While the invention has been particularly shown and described with reference to preferred embodiments thereof, it will be understood by those skilled in the art that various changes in form and details may be made therein without departing from the spirit and scope of the invention.

LIST OF REFERENCE NUMERALS 10 receptacle
12 lid
14 bottom
16 front wall
18 rear wall
20 side wall
22 connection element
24 opening
26 cable
28 surface of the side wall
30 pivot axis
32 guide
34 guide element
36 engagement element
38 recess
40 sealing groove
42 sealing rib
44 pin-shaped element
46 recess
48 distance element

What is claimed is:

1. A housing assembly comprising:
a receptacle having a bottom, a front wall, a rear wall, the rear wall having a larger height than the front wall, and two side walls that decrease in height from the rear wall toward the front wall, the receptacle being configured to receive at least one connection element for connecting at least one electrical cable and having at least one opening for the at least one electrical cable, and
a lid configured to close the receptacle, the lid being pivotably disposable on the receptacle with a pivot axis adjoining the rear wall of the receptacle,
wherein the two side walls of the receptacle each include a guide for seating the lid on the receptacle and for guiding the lid along a desired path in a pivoting movement, each guide being configured as a recess on an outer surface of the respective side wall, the recess being configured to guide the lid through the pivoting movement along a circular path in response to opening and closing of the lid, and wherein the lid includes guide elements integrally formed thereon that engage the guides, each guide element being formed as a bent nose-shaped plug and having a contour that corresponds to a contour of a respective one of guides.

2. The housing assembly recited in claim 1, wherein the receptacle is configured to receive the at least one connection element at the rear wall thereof.

3. The housing assembly recited in claim 1, wherein the receptacle is configured to receive the at least one connection element so as to dispose the connection element at an angle of >0° with respect to the bottom of the receptacle.

4. The housing assembly recited in claim 1, wherein the at least one opening is disposed in the rear wall of the receptacle.

5. The housing assembly recited in claim 1, wherein a surface of the side wails that adjoins the lid includes at least two negative slope angles, the negative slope angles decreasing in degree from the rear wall toward the front 6. The housing assembly recited in claim 1, wherein the lid is fastenable to the receptacle by hinging into a recess provided in an area of the rear wall of the receptacle.

7. The housing assembly recited in claim 1, further comprising a sealing rib configured to engage into a sealing groove so as to seal the housing.

8. The housing assembly recited in claim 7, wherein the sealing rib is disposed on the lid and the sealing groove is disposed on the receptacle.

9. The housing assembly recited in claim 1, wherein the lid includes at least one pin shaped element configured to engage a recess in the receptacle upon closing of the lid on the receptacle.

10. The housing assembly recited in claim 1, wherein the at least one opening includes a plurality of openings, and wherein the openings are disposed at different respective heights relative to the bottom of the receptacle.

11. The housing assembly recited in claim 1, wherein the receptacle includes at least one receptacle distance element configured to engage the at least one connection element upon a receiving of the at least one connection element in the receptacle.

\* \* \* \* \*